United States Patent
Dahlgren et al.

(10) Patent No.: US 7,131,022 B2
(45) Date of Patent: Oct. 31, 2006

(54) TIMING GENERATOR SYSTEM FOR OUTPUTTING CLOCK SIGNALS TO COMPONENTS OF AN IMAGING SYSTEM ACCORDING TO DECODED TIMING CONTROL INSTRUCTIONS

(75) Inventors: Gunnar Dahlgren, Gothenburg (SE); Per Kannermark, Malmo (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 489 days.

(21) Appl. No.: 10/410,990

(22) Filed: Apr. 9, 2003

(65) Prior Publication Data

US 2004/0019817 A1  Jan. 29, 2004

Related U.S. Application Data

(60) Provisional application No. 60/380,749, filed on May 14, 2002.

(30) Foreign Application Priority Data

Apr. 10, 2002 (SE) .................................... 0201082
Apr. 8, 2003 (SE) ...................... PCT/SE03/00566

(51) Int. Cl.
*G06F 1/08* (2006.01)
(52) U.S. Cl. ....................... 713/500; 713/501
(58) Field of Classification Search ........ 713/500–601; 348/312, 500
See application file for complete search history.

(56) References Cited

U.S. PATENT DOCUMENTS

| | | | | |
|---|---|---|---|---|
| 4,615,005 A | * | 9/1986 | Maejima et al. | ............. 713/601 |
| 4,922,137 A | | 5/1990 | Small et al. | |
| 5,247,656 A | * | 9/1993 | Kabuo et al. | ................ 713/501 |
| 5,483,290 A | | 1/1996 | Ohtsubo et al. | |
| 5,581,303 A | | 12/1996 | Djabbari et al. | ............. 348/524 |
| 5,758,094 A | | 5/1998 | Goettsch | ...................... 395/200 |
| 5,790,877 A | * | 8/1998 | Nishiyama et al. | ......... 713/323 |
| 6,211,850 B1 | | 4/2001 | Komatsu | ...................... 345/87 |

(Continued)

FOREIGN PATENT DOCUMENTS

EP   0730372 A2   9/1996

(Continued)

OTHER PUBLICATIONS

Infineon, XC164 16-Bit Single-Chip Microprocessor with 166SV2 Core, Feb. 2002, Infineon Technologies AG Munchen Germany.

*Primary Examiner*—James K Trujillo
*Assistant Examiner*—Paul Yanchus
(74) *Attorney, Agent, or Firm*—IP Creators; Charles C Cary (57) ABSTRACT

A timing generator comprising a programmable program memory that is arranged to comprise program instructions for controlling the generation of timing signals, a timing generator controller for processing the program instructions from the program memory, and an output timing signal controller. The output timing signal controller is connected to the timing generator controller for reception of control data and a timing signal specification that determine the appearance of said timing signals. The output timing signal controller is arranged to provide a plurality of output timing signals. The timing generator controller includes a decoder for decoding program instructions from the memory. An imaging device comprising an image sensor, an analogue image processor, an analogue to digital (A/D) converter, and a timing generator, according to the description given above, providing timing signals to the image sensor, the analogue image processor and the A/D converter.

11 Claims, 3 Drawing Sheets

Timing Generator System

U.S. PATENT DOCUMENTS

| | | |
|---|---|---|
| 6,285,399 B1 | 9/2001 | Tao |
| 6,307,393 B1 | 10/2001 | Shimura ..................... 324/765 |
| 6,845,454 B1 * | 1/2005 | Kim ........................... 713/300 |
| 2002/0135690 A1 | 9/2002 | Tashiro et al. .............. 348/312 |

FOREIGN PATENT DOCUMENTS

| | | |
|---|---|---|
| EP | 0851676 A2 | 7/1998 |
| EP | 0859509 A2 | 8/1998 |
| EP | 0851676 A3 | 7/1999 |
| JP | 2001238138 | 8/2001 |
| WO | WO 01/15436 A1 | 3/2001 |
| WO | WO 01/26363 A1 | 4/2001 |

* cited by examiner

TIMING GENERATOR SYSTEM FOR OUTPUTTING CLOCK SIGNALS TO COMPONENTS OF AN IMAGING SYSTEM ACCORDING TO DECODED TIMING CONTROL INSTRUCTIONS

CROSS REFERENCE TO RELATED APPLICATION

This application claims the benefit of priority to Swedish Application No. 0201082-5, filed on Apr. 10, 2002, entitled "Imaging Device and Timing Generator", to PCT application No. PCT/SE03/00566, filed on Apr. 8, 2003, entitled "Imaging Device and Timing Generator" and to prior filed co-pending Provisional Applications No. 60/380,749, filed on May 14, 2002 entitled "Imaging Device and Timing Generator" which are incorporated herein by reference in their entirety as if fully set forth herein.

TECHNICAL FIELD OF THE INVENTION

The invention relates to imaging devices and timing generators for generating timing signals in an imaging device.

BACKGROUND OF THE INVENTION

The technical field of electronic imaging is evolving fast and there are a lot of different manufacturers producing components and systems for electronic imaging.

The imaging systems, and especially the image sensor, require intricate timing signals in order to operate. Further, the required signals varies in both function and appearance between different systems and between different implementations of specific components.

The timing signals are generated by means of a timing generator. Often the timing generators are implemented as complex state machines that are designed to provide timing signals to a specific imaging system implemented by means of a specific set of components. Thus, a new timing generator has to be manufactured for every new imaging system and every time a component in an existing imaging system is exchanged for another one of said component. To design and produce a new timing generator every time a signal has to be added or altered is time-consuming and expensive.

In order to overcome the above mentioned problem some more or less programmable timing generators have been developed.

In the international application WO 01/15436 A1 there is described a timing generator that generates waveforms based on a waveform control word stored in a single static random access memory (SRAM). Additionally, the timing generator includes a line control unit for generating a lower level waveform, a frame control unit and an arbitrator. The arbitrator controls the distribution of waveform control words to the line control unit and the frame control unit. The control of the arbitrator is based on signals provided from the line control unit and the frame control unit, respectively. Said signals being a signal from the frame control unit regarding an ended frame cycle and signals from the line control unit regarding an ended cycle or a reception of the next line type. Basically, the system generates a signal in accordance with a waveform control word including the level of each timing signal and a value indicating the number of cycles this word defines the levels of the timing signals. When the indicated number of cycles has been processed the waveform control word in the following address is passed to the control unit for defining the timing signals.

The timing generator above is more flexible than a prior art state machine. However, in some situations said timing generator may require a lot of memory and much effort may be required for setting the waveform control words.

SUMMARY OF THE INVENTION

It is an object of the present invention to provide an improved system for generation of timing signals.

This object is accomplished by means of a timing generator according to claim 1 and by means of an imaging device according to claim 7. Preferred embodiments of the invention are disclosed in the dependent claims.

In particular a timing generator for an imaging system according to one aspect of the invention comprises:

a programmable program memory that is arranged to comprise program instructions for controlling the generation of timing signals, a timing generator controller for processing the program instructions from the program memory, an output timing signal controller, which is connected to the timing generator controller for reception of at least one control signal and an output timing signal specification, the signal specification determine the appearance of the timing signals, and which output signal controller is arranged to provide a plurality of output signals, and wherein the timing generator controller includes a decoder for decoding program instructions from the memory.

By arranging a programmable program memory for including program instructions, a timing generator controller including a decoder of program instructions and an output signal controller responsive to at least one control signal and a timing signal specification, which are provided by the timing generator controller, the timing generator becomes flexible and easy to program. In one embodiment the decoder is able to interpret program instructions and provide control signals at least to devices in the timing generator that are to be affected by a presently executed program instruction. According to one embodiment the program instructions can be defined as sophisticated control instructions, which in most cases make the programming easy. Further, for example, the instruction codes may be assigned to mnemonics and a software tool can be arranged to convert a text file comprising a program written using said mnemonics into binary program instruction words that may be stored in a data file. Thereby, the programming may be performed in a language similar to the assembly language of a microprocessor. The data file may then be downloaded to the imaging system and be used in the timing generator.

According to one embodiment the timing generator controller includes a stack for storing at least one return address to at least one program instruction in the program memory, the program instruction being the program instruction that is to be executed when the end of a subroutine has been reached.

By making it possible to utilise subroutine jumps the program in the program memory only has to include one copy of a procedure or function that is frequently used. Program instructions for subroutine jumps can be inserted anywhere in the execution sequence of a program and as many times as needed. This results in that memory can be saved, because a frequently utilised procedure or function only has to be stored once in the program memory, and that the programming of the timing generator becomes easier, especially for complex timing signal sets, because a person programming only has to write the program instructions of the subroutine once instead of repeating corresponding functionality in every location in the program where it should be executed.

According to one embodiment, the timing generator controller includes a register bank, wherein the register bank includes a register that the timing generator is able to read and at least one system external to the timing generator is able to write.

By implementing the above register it becomes possible to dynamically change the behaviour of timing signals sent from the timing generator in a process in progress without interrupting said process. This is a result of the register being possible to write from systems external to the timing generator and the register being readable from within the timing generator. By referring to the register in a program instruction the instruction dynamically changes whenever the value of the register is changed. This feature may, for example, be advantageous for systems delivering frequently updated images in which some parameter has to be changed during acquisition of an image sequence. Some examples of such parameter is the exposure time, the number of images that are to be sent per second, number of rows in an image, etc.

According to one embodiment the timing generator controller further includes a register bank, wherein the register bank includes a register that is accessible as read and write from the timing generator.

The advantage of including such a register is that it becomes possible to implement the use of variables, loops having a predetermined number of cycles, etc., without having to access the program memory from the timing generator controller in order to store the data of the variables. By providing functionality such as said loops and variables the system may become even more flexible without affecting the physical size of the system too much.

Further, in one embodiment, the timing generator comprises an input signal line for reception of a clock signal for timing the operation of the timing generator, wherein said clock signal is synchronous with a pixel timing signal. By timing the timing generator by means of a timing signal that is synchronous with the pixel timing signal the timing generator becomes easy to program. This is the case because the pixel timing signal, comprising pixel clock signal cycles, is the most basic timing signal in the imaging system and a signal that most processes depends on. Thus, a programmer of the timing generator in accordance with this embodiment is able to program the timing generator by considering the number of multiples of pixel clock signal cycles, i.e. cycles of the timing signal that is timing the timing generator.

In order to make the timing generator small and inexpensive the programmable program memory, according to a preferred embodiment of the invention, is made accessible by the timing generator controller as read only and is made of a size lesser than or equal to 1 kbyte. The restriction of the program memory being accessible as read only by the timing generator controller may result in that there is no need for any devices keeping track of data written to the memory, and in that the size of the memory only has to be of such size that there is room for programs. However, in some applications it may be useful to be able to write to the program memory of the timing generator. Further, the memory is the portion of the timing generator that requires most space and, thus, by limiting the size of the memory to 1 kbyte the timing generator becomes small. Despite the small size of the memory it is possible to implement complex timing signals because of the features presented above.

According to another aspect of the invention there is provided an imaging device comprising an image sensor, an analogue image processor, an analogue to digital (A/D) converter, and a timing generator providing timing signals to the image sensor, the analogue image processor and the A/D converter, wherein the timing generator corresponds to any one of the embodiments mentioned above.

According to one embodiment, at least the programmable program memory, the decoder, the output signal line controller and the stack of the timing generator is arranged in one single integrated circuit. This results in that the imaging device and, especially, the timing generator may become inexpensive. Further, such image system may be easy to manufacture because of the fact that it is easier to mount few circuits than a plurality.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF THE EMBODIMENTS

Figure 1:
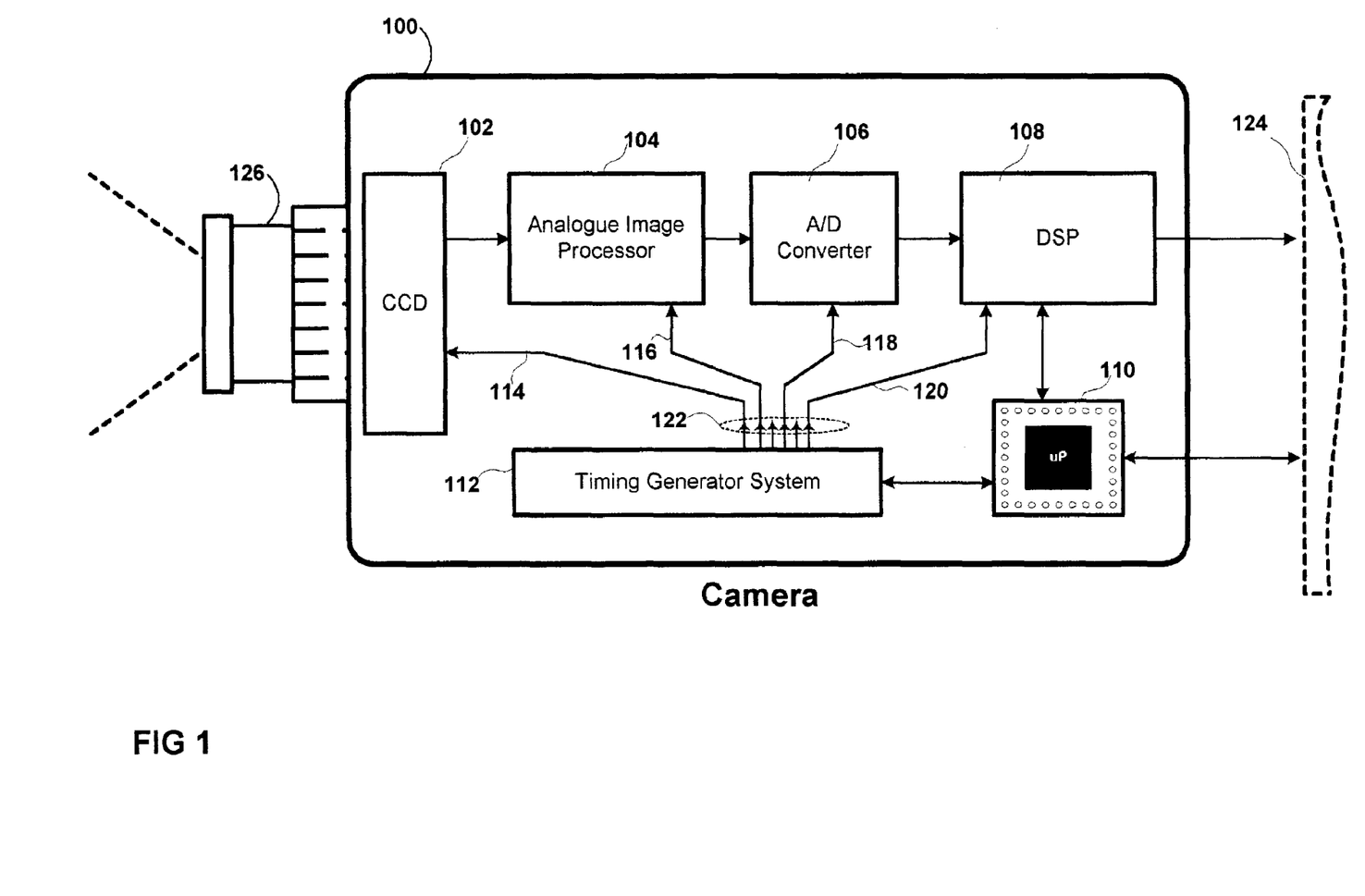
FIG. 1 is a schematic block diagram of an embodiment of an imaging system.

In FIG. 1 an imaging system is partially shown. Such imaging system is typically implemented with a video camera, a surveillance camera, a still camera, a network camera, a web camera, etc and any related processing systems 124 to which it is coupled. In the embodiment shown a video camera 100 with a lens 126 is shown coupled to a next stage 124 of the imaging system for performing further processing or interpretation of the images obtained by the video camera. Stage 124 may be internal or external to the video camera. The video camera preferably comprises: an image senor 102, an analogue image processor 104, an analogue-to-digital (A/D) converter 106, a digital signal processor (DSP) 108, a microprocessor 110, and a timing generator system 112. The timing generator system provides timing signals 122 to other components of the system.

The video camera captures an image via reflected light defining the image. The reflected light is preferably captured by a lens system 126 and directed onto the image senor 102, which could be a Charge Coupled Device (CCD) or a CMOS-type image sensor. The image senor 102 is controlled by means of a plurality of timing signals 114 that are provided by the timing generator system 112. The required signal function over time for such timing signals 114 may vary for different image sensors, even the operations controlled by the timing signals 114 may vary for different image sensors.

The image captured by the image senor 102 is represented by analogue, electrical signals and is passed to the analogue image processor 104 when the image senor 102 has been exposed to the light during a specific time period. The functioning of such analogue image processors 104 is known to those skilled in the art. The analogue image processor 104 also needs timing signals 116 for proper operation. These timing signals 116 are also provided by the timing generator system 112. The timing signals 116 controlling the analogue image processor 104 may also have to be varied depending on the analogue image processor 104 used in the system.

When the analogue image processor 104 has processed the analogue representation of the image, the image is converted to digital information by means of the A/D converter 106. In most imaging systems the A/D converter 106 also needs to be timed by means of at least one timing signal 118. In one embodiment of the invention such timing is performed by means of the timing generator system 112.

The digital representation of the captured image is then processed in the DSP 108, which also may need timing signals 120 generated by the timing generator system 112. However) this often depends on the design of the imaging system.

The processed digital image is then passed to a system 124 for processing the digital image in accordance with the overall purpose of the imaging system. For example, said processing could include coding of the image in accordance with a coding standard, e.g. JPEG, MPEG, PAL, generating an image and/or video file for storage in an external or internal memory, or arranging the image data for transfer via a network, e.g. a telephone network, a computer network, a network for television signals, a surveillance network.

In one embodiment the imaging system comprises a microprocessor 110 arranged for controlling the overall performance of the imaging system. In accordance with one embodiment the microprocessor is also enabled to provide parameters to the timing generator system 112 in order to affect the capturing of images.

The timing generator system 112 is arranged to generate the timing signals that are required by the imaging system. The timing generator system 112, according to one embodiment, is a programmable timing generator system 112 in which the function over time of the timing signals are easy to program, and alter to handle different component and/or different image processing requirements for the same set of components. According to a specific embodiment the timing signals are easy to change dynamically during the capture of an image sequence.

Figure 2:
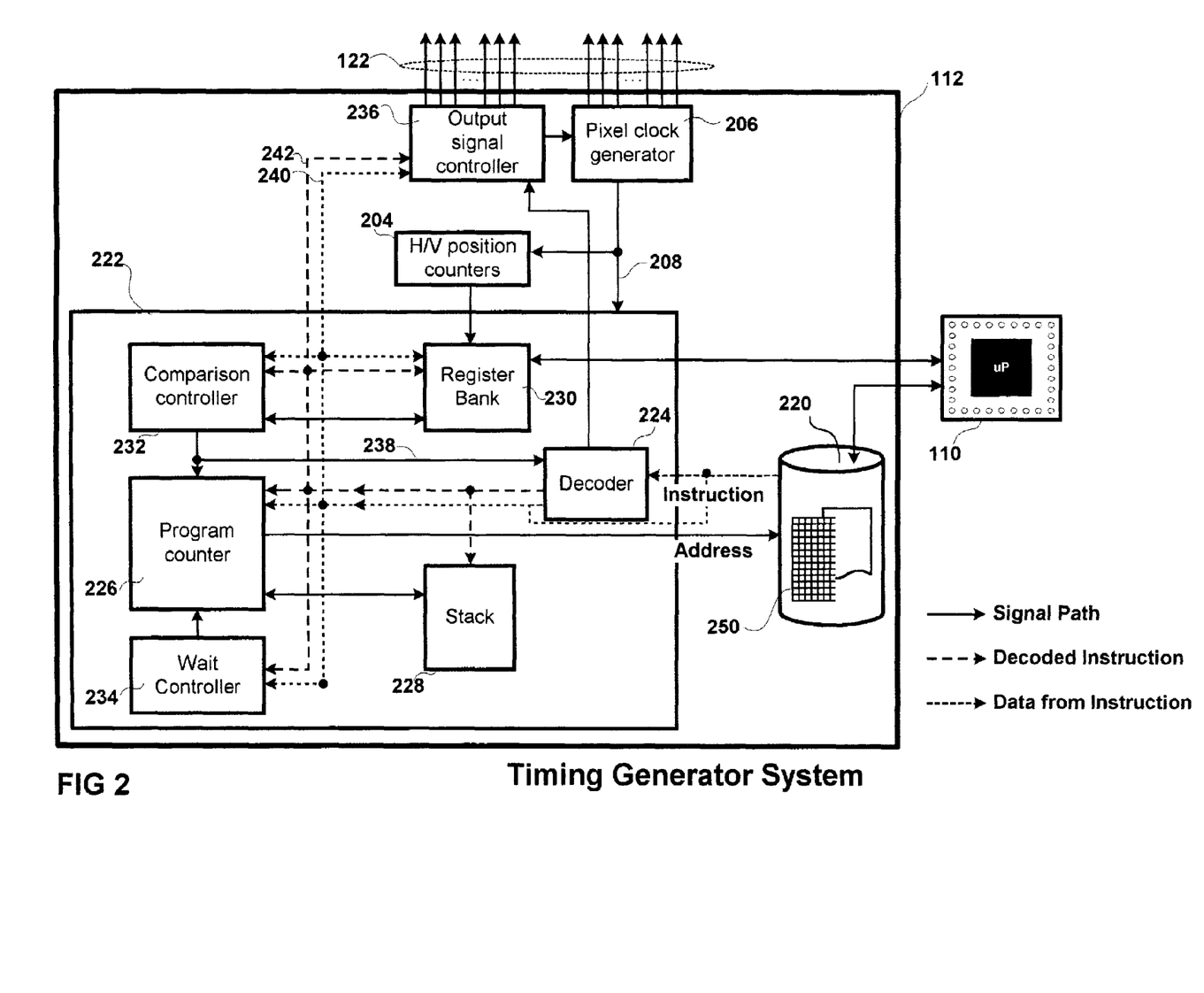
FIG. 2 is a detailed hardware/software block diagram of an embodiment of the timing generator system shown in FIG. 1.

FIG. 2 is a detailed hardware/software block diagram of an embodiment of the timing generator system shown in FIG. 1. According to this embodiment the timing generator system comprises horizontal and vertical (H/V) position counters 204, for keeping track of the coordinates of the pixel in the image sensor that is presently handled, a pixel clock generator 206, for providing high frequency timing signals, a programmable program memory 220 for holding program code 250, a timing generator controller 222, and an output timing signal controller 236. In one embodiment the timing generator system may be implemented in one Integrated Circuit (IC). However, some parts of the timing generator system may be implemented separately from such IC.

According to one embodiment the pixel clock generator 206 receives a high frequency clock signal from a crystal and generates, from this high frequency clock signal, high frequency timing signals of the imaging system, e.g. it provides the timing signals 208 internal to the timing generator system 112 at pixel clock frequency and it provides the image sensor 102 of the imaging system with timing signals of pixel clock frequency.

Additionally, the pixel clock generator 206 may provide timing signals having a pixel clock cycle to other devices than the timing generator system 112 and the image sensor 102. For example, the pixel clock generator 206 may provide an output signal of pixel clock frequency to the image sensor as horizontal CCD drive or corresponding signal; to the timing generator system 112; to the analogue image processor as a sample and hold pulse; to the A/D converter as a clock signal; etc.

The pixel clock generator 206 generates the most basic timing signals, which other more advanced timing signals may be based on. By basing the processing cycles of the timing generator on the pixel clock signal cycle it is easy to program the output timing signals as functions of either the pixel clock signal cycle or the execution cycle of the program.

In addition to the above mentioned, the pixel clock generator 206 may receive a timing signal from the output signal controller 236. Such signal is arranged for controlling the output of some of the timing signals from the pixel clock generator 206. For example, the control signal may act as a gate signal, thus stopping the controlled signals from reaching their destination or letting the controlled signals pass through to their destinations.

The H/V counters 204 are a set of counters arranged to count clock cycles in order to keep track of the x and y coordinate of the pixel presently handled and to provide this information to the timing generator 222. In order to manage this the H/V counters 204 receive at least one timing signal from the pixel clock 206, the timing signal corresponds to the signal timing the processing of each pixel, i.e. pixel clock. Further, the H/V counters 204 utilise registers in which the microprocessor 110 stores a value indicating the number of pixels that are to be interpreted as one row of an image and a value indicating the number of rows that are to be interpreted as one image frame. The information of those registers and the timing signal received from the pixel clock generator 206 are then utilised in order to make the counters keep track of the x coordinate and the y coordinate presently handled by the imaging system. For example, an x coordinate counter counts every timing cycle from the pixel clock generator 206 and is reset when it has counted a number of pixels corresponding to the stored value that indicates the number of pixels in a row. This reset signal also triggers a y coordinate counter, which is reset when it has counted a number of rows corresponding to the stored value that indicates the number of rows in an image frame. The counter may also be implemented to count the y coordinates in the way the x coordinates are counted above and to count the x coordinates in the in the way the y coordinates are counted above. In such case the value that indicates the number of pixels in a row instead indicates the number of pixels in a column.

In one embodiment the H/V counters 204 count all clock cycles, even those occurring during blanking periods, i.e. the period when no pixel data is outputted from the image sensor 102.

The programmable program memory 220 is arranged to store the program instructions controlling the timing generator and its output signals. The programmable program memory 220 is enabled to be programmed from an external source, for example an external computer connecting with the imaging device or the microprocessor 110 within the imaging device. In one embodiment the microprocessor provides a program to the programming memory during initiation of the imaging system. The program may also be provided from the microprocessor in connection with a user selection of image format or similar. In such case it may be possible to store different programs for different imaging functionalities or imaging formats in a memory of the microprocessor, the program being downloaded to the program memory 220 when a change in function or format is performed. However, the timing generator system 112 enables programming of complex timing generating sequences and in some cases altering values of registers may be utilized to change the function of the timing generator system 112. The program instruction word length in the memory is of such size that it makes it possible to define the necessary program instructions and provide space for possible specification of data connected to the program instruction. This allows variation in the timing signals generated from the initially specified data based on the logic operations set forth in the program instruction portion of the program instruction word. In an embodiment of the invention the program instruction word length may be between 8–64 bits. In an other embodiment of the invention the program instruction word is set to 16 bits.

The timing generator controller 222 is arranged to read, interpret, and execute program instructions from the program memory 220. In one embodiment the timing generator controller 222 only is allowed to read the program memory 220, i.e. the timing generator controller 222 is not allowed to write to the program memory 220. The timing generator controller 222 comprises logic and processing means for fulfilling its task, e.g. the timing generator controller may include a decoder 224 for interpreting program instructions, a program counter 226 for determining the memory address of the next program instruction to execute, a stack 228 for holding a return address for a subroutine jump, a register bank 230 for storage of data utilised in the timing generator controller, a comparison controller 232 for comparing data and initiating conditional operations, a wait controller 234 for controlling the processing of a wait program instruction, etc.

The output timing signal controller 236 is arranged to generate timing signals based on a signal specification from the program instructions of the program code 250. The signal specification and other control parameters may be provided to the output timing signal controller 236 via the timing generator controller 222. The output timing signal controller 236 is arranged to provide a plurality of output timing signals, e.g. vertical clocks, blanking signals, clip pulses. An embodiment of the output timing signal controller will be given below.

The timing generator controller comprises: a decoder 224 for interpreting program instructions in the program code 250 and for providing necessary data and/or control signalling to a device/process affected by the presently executed program instruction; a program counter 226 for controlling which program instruction, e.g. by means of the memory address of said program instruction, are to be sent to the decoder during each processing cycle; a stack 228 for storage of a return address for a subroutine jump, i.e. the stack stores the address of the program instruction that is to be executed when a subroutine jump is ended; a register bank 230 for temporary storage of data utilised by the timing generator controller and for storage of special read only variables or constants; a wait controller 234 for executing program instructions saying that the output timing signals are not to be altered and/or no other program instruction is to be executed during at least a specified number of processing cycles; and a comparison controller 232 that is provided in order to facilitate implementation of, for example, conditioned operations, e.g. corresponding to an "If" operation in some programming languages, and/or loop operations, e.g. corresponding to a "For . . . next" operation in some programming languages.

For example, the operation of the decoder 224 may be as follows. The decoder 224 receives a program instruction word from an address indicated by the program counter 226, in the program memory 220. In an embodiment of the invention the program memory may be physically separate from the timing generator controller. The decoder 224 decodes the program instruction word and generates one or a plurality of control signals addressed directly to the device/devices that are to be involved in or enabled during the execution of the decoded program instruction. In an embodiment of the invention each instruction of the instruction set of the program code is designed to execute in one clock cycle of the pixel clock generator. The paths transporting control signals, i.e. the path for decoded instructions, are depicted in the figure as long dashed lines. These paths may comprise one signal line for each device that is to receive control signals from the decoder. In one embodiment the decoding of program instructions is achieved by making the decoder recognise and identify different program instructions from the bit pattern of each program instruction and generating the control signal/signals corresponding to the identified program instruction.

Further, the decoder 224 can provide data that are embedded in the instruction to a device or devices processing or handling instructions. Such data is passed directly to the appropriate component with the decoder serving only as a router. The paths for such data are indicated by the short dashed lines. The data may be extracted from a data portion of the program instruction word and passed on by the decoder 224 or it may be passed on together with the instruction portion of the program instruction word, i.e. no extraction at the decoder, from the decoder or directly from the program memory 220. This data and possible paths for same are shown in short dashed lines. Where data is passed on along with an instruction, the extraction of data is achieved at the respective device, if the design of the program instructions permit, the extraction may be as simple as letting predetermined bits pass through to the device while the rest is ignored. This approach works well if the data that are to be read by a specific device always is stored in the same portion of the program instruction word. In one embodiment the program instruction word is provided as data to all devices that in accordance with at least one instruction need to get data from the program instruction, independently of whether the presently executed instruction relates to a particular device or not. In such embodiment the enable signals may be used to make the devices, which are to be affected by the program instruction and its data, take care of the data provided.

In one embodiment the decoder 224 provides the output signal controller 236 with at least one control signal and data, in the form of an output signal specification, from a program instruction.

In one embodiment the decoder receives a control signal 238 from the comparison controller that instructs the decoder not to handle the next program instruction. For example the signal may block the program instruction path from the program memory during one execution cycle. Such design may be used to implement simple "IF"-operations.

For example, the operation of the program counter 226 may be as follows. The program counter 226 keeps track of the address to the presently executed program instruction and provides, if nothing else is ordered by another device of the timing generator controller, an address in memory 220 of the program instruction that is to be executed during the next execution cycle by simply adding a value, corresponding to a jump to the next program instruction, to the address of the presently executed program instruction.

Further, the program counter 226 is connected to the stack 228 for receiving a return address when a program instruction regarding returning the execution of the program from a presently executed subroutine is executed. The program counter 226 is also connected to the stack 228 for providing the stack with a return address for use when the end of the subroutine is reached. In the latter case the address to the next program instruction to be executed during normal execution of the program is provided to the stack, see below. The address of the program instruction that the jump to subroutine program instruction refers to is provided to the program counter 226 and is sent to the program memory 220 via the program counter 226 as the address of the next program instruction to be executed. The address to the program instruction that the jump to subroutine program instruction refers to is, for example, included in the data of the jump to subroutine program instruction.

Further, the program counter 226 may be connected to the wait controller 234, see below.

In an embodiment of the invention the stack 228 is implemented as a Last In First Out (LIFO) register. When a jump to subroutine program instruction is executed the decoder 224 sends a signal to the stack 228 telling it to push the address provided from the program counter 226 to the top of the stack. The address corresponds to the address of the next program instruction, i.e. the program instruction following the jump to subroutine program instruction in the program memory 220. When an end of subroutine program instruction is executed the decoder sends a signal to the stack telling it to pop the latest address that was pushed to the stack, i.e. the topmost address in the stack. This address is then provided to the program counter 226 and is handled in the program counter 226 as described above.

In an embodiment of the invention the register bank 230 includes special registers that the timing generator is able to read and that the micro processor 110 is able to write to. This registers makes it possible to make the microprocessor and/or the user of the system dynamically change the behaviour of the timing generator and, thus, the imaging device. For example, the exposure time of the imaging sensor can be adjusted during operation by making the program instructions affecting a timing signal controlling the exposure time of the image sensor depend on the value of one such register. Further, one of these registers may be used to provide the number of rows in an image frame. In an embodiment of the invention the timing generator is only allowed to read said registers.

In addition the register bank 230 may include registers that are possible to read and write from the timing generator controller. Such registers may be utilised for storing variables, temporary storage of loop conditions, e.g. the number of loops such operation has left.

Further, in addition the register bank 230 may include two read-only, in regard of the timing generator controller, registers that contain the value of the H-counter and the V-counter, respectively, i.e. the x coordinate and the y coordinate, respectively, discussed in connection with the H/V position counters 204.

The register bank 230 is responsive to a decoded instruction signal indicating that the data of a register is to be outputted from the register bank 230. Further the register bank 230 is responsive to a decoded instruction signal indicating that data are to be written to a register. When such instructions are detected by the register bank the data on the data path correspond to an address to which data are to be written to and an address from which data are to be read, respectively. Further, during a read instruction the data on the data path include data regarding where to send the data from the register. For example, the data may be transferred to the comparison controller 232 or the value of the data may be decreased by one and rewritten to the same register. According to one embodiment the register bank is arranged so that two different registers may be read during the same execution cycle.

For example, the wait controller 234 is a counter which provides the program counter 226 with a control signal. The wait controller is activated by a decoded program instruction signal from the decoder 224. When the wait controller receives the decoded program instruction signal the data path includes data corresponding to the number of execution cycles the timing generator are ordered not to execute program instructions, the counter is set to the value of the data and the control signal provided to the program counter is changed in order to stop the program counter. Then the value of the counter of the wait controller is decreased for every execution cycle and when counter of the wait controller reaches a predetermined value, e.g. zero, the control signal is changed again and the program counter 226 is enabled again and the execution of program instructions is resumed.

For example, the comparison controller 232 is arranged to compare two source operands and generate a result signal indicating whether the comparison was "true" or "false". The result signal may be sent to the program counter 226, in order to initiate conditional jumps to an address specified in a data field of a program instruction word, or to the decoder 224, in order to inhibit the effect of the next instruction. The source operands to compare may, for example, be register values from the register bank 230, or a data field of the presently executed program instruction. In one embodiment the type of comparisons performed might be "equals", "greater than" or "less than".

In one embodiment the timing generator controller 222 is arranged to generate an interrupt signal to the microprocessor 110. The interrupt signal may, for example, be sent at the start of registering an image or at the end when the image has been retrieved from the image sensor.

Figure 3:
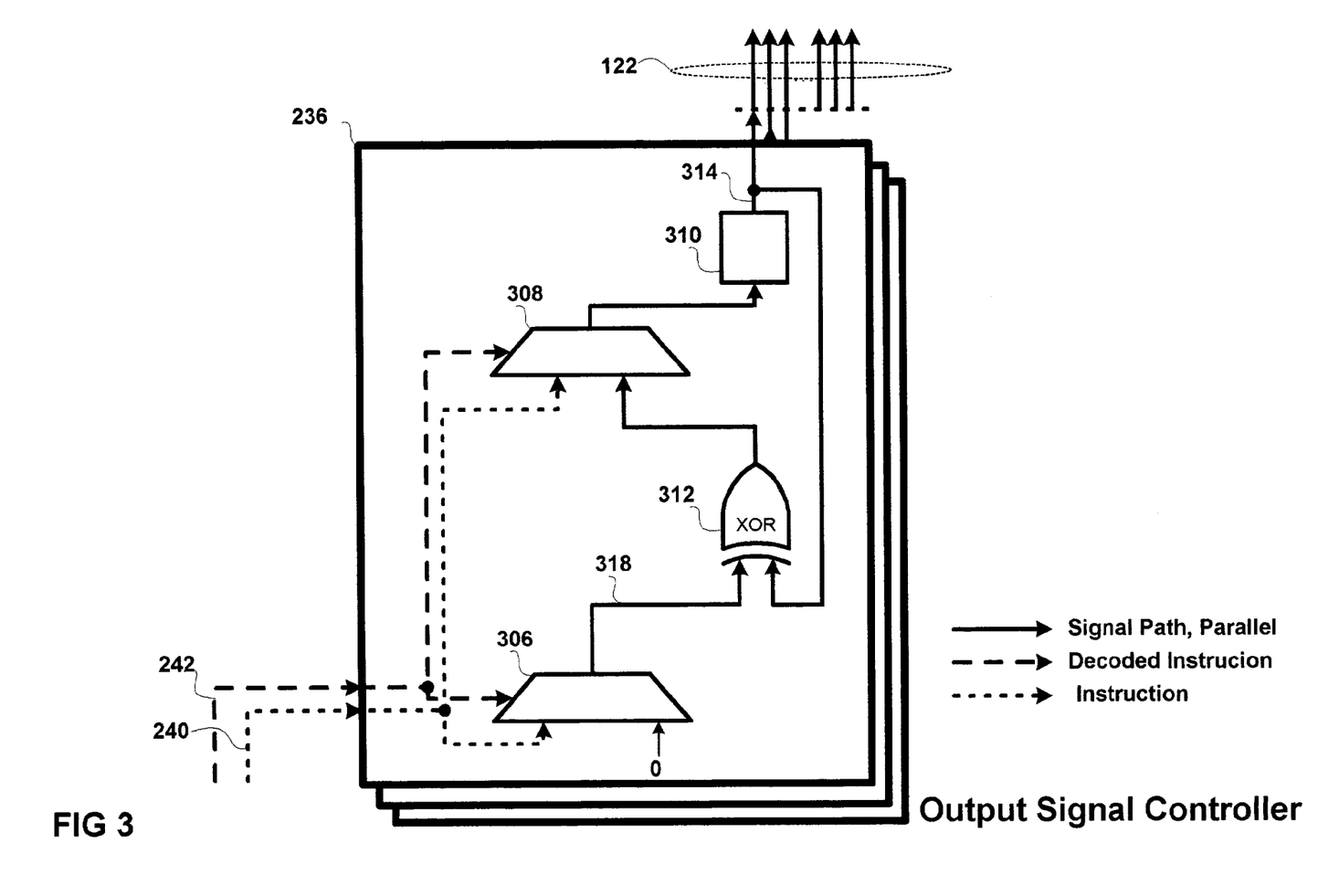
FIG. 3 is a detailed hardware/software block diagram of an embodiment of the output signal controller shown in FIG. 2.

FIG. 3 is a detailed hardware/software block diagram of an embodiment of the output signal controller 236 shown in FIG. 2. The output signal controller comprises: a mask selector 306, a signal selector 308, a flip-flop 310 and an XOR gate 312. The selectors 306–308 may be multiplexors. In the embodiment a plurality of output signals is processed in parallel, for example, the signal path in the figure, depicted by the continuous line, includes the representation of a plurality of output signals. Thus, the selectors 306 and 308, the flip-flop 310 and the XOR-gate 312 are arranged to process a plurality of output signals in parallel. In order to visualize the parallel signal lines the output of the output signal controller is drawn as a plurality of signal lines.

The path for decoded instructions 242 and the data path 240 providing data embedded in the instruction corresponds to the paths in FIG. 2 that transfer control signals and data embedded in the instruction word, respectively, from the decoder to the output signal controller.

The output signals of the output signal controller 236 are constant as long as no program instruction order the output controller to load a new bit pattern representing the level of each signal or to load a mask that is used to alter the level of at least one signal by means of the XOR-gate 312. When no such instructions are executed the output signals at signal lines 314 are returned to the input of the flip-flop 310 without any changes and are then passed through in response to a timing signal timing the output signal controller. The timing signal may correspond to the timing signal that is arranged to time the timing generator controller. Thus, the output signals is kept constant if the program instructions do not instruct to make any changes.

The signal selector 308 is arranged to pass through one of two signal paths, each including a plurality of signals, to the input of the flip-flop. When the presently executed program instruction does not include instructions for replacing the output signals, the signal selector 308 is set to pass through the signals provided by the XOR gate 312, and when the presently executed program instruction does include instructions for replacing the output signals, the signal selector 308 is set to pass through a bit pattern, i.e. a signal specification, provided by the program instruction. The selection of which input pattern to pass through is controlled by means of a control signal sent from the decoder via the control signal path 242. The bit pattern provided by a program instruction is provided via the data path 240 providing data embedded in the instruction.

The mask selector 306 is arranged to pass through a bit pattern of zeros to the XOR gate 312 when the presently executed program instruction does not include instructions for altering at least one output signal, the number of parallel zeros passed through the mask selector corresponds to the number of output signals. However, when the decoder receives a program instruction including instructions for altering at least one output signal, the mask selector 306 is set to pass the data bit pattern of the program instruction word to the XOR gate. The selection of which input pattern to pass through is controlled by means of a control signal sent from the decoder via the control signal path 242. The bit pattern provided by a program instruction is provided via the data path 240 providing data embedded in the instruction.

The XOR gate 312 then output signals corresponding to an XOR operation of the output signal 314 from the output signal generator and the output signal 318 from the mask selector 306. For example if the output signal from the mask selector 306 is "11001110110001", in parallel, and the output signal 314 from the output signal generator is "11111111111110", the output signal from the XOR gate becomes "00110001001111". This function may, for example, be used if one or some of the output signals are to be altered while the present output signal on the other lines are not known.

According to one embodiment the program memory is arranged to store program instruction words having a length of 16 bits. Examples of an embodiment of a program instruction set and corresponding bit patterns for each instruction are presented in Table 1 below, and the function of the respective program instruction of Table 1 is presented in Table 2.

TABLE 1

| Instruction | Opcode, bits |
|---|---|
| | 15 14 13 12 11 10 9 8 7 6 5 4 3 2 1 0 |
| set_sig <values> | 0 0 <--------values--------> |
| inv_sig <mask> | 0 1 <---------mask---------> |
| if = <r1> <r2> | 1 0 0 0 0 0 0 0 0 0 < r1> < r2> |
| if = q <r> <val> | 1 0 0 0 1 <r> <--------val--------> |
| if> <r1> <r2> | 1 0 0 1 0 0 0 0 0 0 < r1> < r2> |
| if< <r1> <r2> | 1 0 0 1 1 0 0 0 0 0 < r1> < r2> |
| set_reg_lo <reg> <val> | 1 0 1 0 0 <reg> <-----val-----> |
| set_reg_hi <reg> <val> | 1 0 1 0 1 <reg>0 0 0 0 <--val--> |
| move <r1> <reg> | 1 0 1 0 1 <reg> 1 0 0 0 0 < r1> |
| dec_br <reg> <addr> | 1 0 1 1 0 <reg> <-----addr-----> |
| jump <addr> | 1 0 1 1 1 0 0 0 <-----addr-----> |
| jsr <addr> | 1 1 0 0 0 0 0 0 <-----addr-----> |
| ret | 1 1 0 0 1 0 0 0 0 0 0 0 0 0 0 0 |
| waitq <cycles> | 1 1 0 1 0 <---------cycles---------> |
| nop | 1 1 0 1 0 0 0 0 0 0 0 0 0 0 0 1 |
| wait <r> <value> | 1 1 0 1 1 <r> <------value------> |
| wait_r <r1> <r2> | 1 1 1 0 0 0 0 0 0 0 < ri> < r2> |
| gen_irq | 1 1 1 0 1 0 0 0 0 0 0 0 0 0 0 0 |
| set_extra <values> | 1 1 1 1 0 0 0 0 0 0 0 0 <---v---> |
| inv_extra <mask> | 1 1 1 1 1 0 0 0 0 0 0 0 <---m---> |

The program instructions of Table 1 and Table 2 are designed for an embodiment where the register bank 230 is an 8×12 bit register bank. The registers of said register bank are as follows: registers 0–3 corresponds to the read/write register described above, the register 4 corresponds to the read only register containing the value of the H counter, the register 5 corresponds to the read only register containing the value of the V counter, and the registers 6–7 correspond to the read only, with regard to the timing generator controller 222, register that the microprocessor 110 is able to write in.

TABLE 2

| Instruction | Description |
|---|---|
| set_sig <values> | Sets output timing signals to <values> |
| inv_sig <mask> | Inverts the masked (bits==1) output timing signals. (XOR) |
| set_extra <values> | Sets extra output timing signals. |
| inv_extra <mask> | Inverts the masked of the extra output timing signals. |
| if= <r1><r2> | If r1==r2, exec next instr. Else exec a nop, and skip the next instruction. |
| if=q <r><val> | If reg 4+r=={000, val} exec next instr. Else exec nop & skip next instr. |
| if> <r1><r2> | If r1>r2, execute next instr. Else execute nop. |
| if< <r1><r2> | If r1<r2, execute next instr. Else execute nop. |
| set_reg_lo <reg><val> | Set lower 8 bits of <reg> to <val>, clear the high 4 bits |
| set_reg_hi <reg><val> | Set higher 4 bits of <reg> to <val>, keep low bits |
| move <r1><r2> | Move the contents of register r1 to register r2. Of course, r2 can only be regs 0–3. |

TABLE 2-continued

| Instruction | Description |
| --- | --- |
| dec_br <reg><addr> | Decrement reg by one, branch if result !=0 |
| jump <addr> | Unconditional Jump to addr |
| jsr <addr> | Jump to addr, save PC+1 on stack. |
| ret | Pop stack, jump to address from stack. |
| waitq <cycles> | Wait for <cycles> clock cycles |
| nop | Alias for Waitq 1. |
| wait <r><value> | Wait until reg r+4 equals {000,value} |
| wait_r <r1><r2> | Wait until reg r1 equals reg r2 |
| gen_irq | Generate an Interrupt to the microprocessor. |

In the tables, r1 and r2 indicate the use of any registers in the register bank, if nothing else is told in connection with the instruction. The use of r indicates the use of registers 4 to 7, according to the table the "r" is to be interpreted as the register r+4.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A timing generator system for an imaging system with a plurality of components and the timing generator system, comprising:
   a programmable program memory that is arranged to comprise program instructions for controlling the generation of timing signals;
   a timing generator controller for processing the program instructions from the program memory and generating at least one control signal and an output timing signal specification there from;
   an output timing signal controller, coupled to the timing generator controller and responsive to the at least one control signal and the output timing signal specification to output timing signals corresponding thereto to corresponding specified ones of the plurality of components;
   a pixel clock generator with a pixel clock frequency corresponding with a pixel processing frequency of the image processing system; and
   wherein the timing generator controller includes a decoder for decoding program instructions from the memory. and wherein the timing generator controller couples with the pixel clock generator to synchronize program instruction execution therewith.

2. The timing generator system of claim 1, wherein the timing generator controller further comprises:
   a stack for storing at least one return address to at least one program instruction in the program memory, decoded by the decoder at an end of a corresponding subroutine.

3. The timing generator system of claim 1, wherein the timing generator controller further comprises:
   a register bank, wherein the register bank includes a register readable by the timing generator controller and writable by at least one of the plurality of components.

4. The timing generator system of claim 1, wherein the timing generator controller further comprises:
   a register bank, wherein the register bank including a register read and write accessible by the timing generator controller.

5. An imaging device comprising:
   an image sensor;
   an analogue image processor;
   an analogue to digital (AID) converter; and
   a timing generator system providing timing signals to the image sensor, the analogue image processor and the A/D converter and the timing generator system including;
      a programmable program memory to store program instructions for controlling the generation of timing signals;
      a timing generator controller for processing the program instructions from the program memory;
      an output timing signal controller, coupled to the timing generator controller for reception of control data and a timing signal specification that determine the appearance of the timing signals and output of a plurality of output timing signals corresponding thereto to specified ones of the image sensor, the analog image processor and the A/D converter; and
      a pixel clock generator for generating high frequency timing signals for the image sensor, wherein the timing of the timing generator is achieved by means of a timing signal that is synchronous with the pixel clock.

6. The imaging device of claim 5, wherein the timing generator controller further comprises:
   a decoder for decoding program instructions from the memory.

7. The imaging device of claim 5, wherein the timing generator controller further comprises:
   a stack for storing at least one return address to at least one program instruction in the program memory, decoded by the decoder at an end of a corresponding subroutine.

8. The imaging device of claim 5, wherein the timing generator controller further comprises:
   a register bank, wherein the register bank includes a register readable by the timing generator controller and writable by at least one system external to the timing system generator.

9. The imaging device of claim 5, wherein said timing generator further includes a register bank, wherein the register bank includes:
   a register bank, wherein the register bank including a register read and write accessible by the timing generator controller.

10. The timing generator system of claim 1, further comprising:
    horizontal and vertical (H/V) position counters configured to track coordinates of pixels processed.

11. The imaging device of claim 5 further comprising:
    horizontal and vertical (H/V) position counters configured to track coordinates of pixels processed by the image sensor.

* * * * *